United States Patent [19]

Skipor

[11] Patent Number: 4,566,351
[45] Date of Patent: Jan. 28, 1986

[54] GEAR HOUSING DEVICE FOR PREVENTING OIL LEAKAGE

[75] Inventor: Eugen Skipor, Chicago, Ill.

[73] Assignee: Rockwell International Corporation, Pittsburgh, Pa.

[21] Appl. No.: 541,636

[22] Filed: Oct. 13, 1983

Related U.S. Application Data

[63] Continuation of Ser. No. 28,762, Apr. 9, 1979, abandoned.

[51] Int. Cl.⁴ .............................................. F16H 57/02
[52] U.S. Cl. .................................... 74/606 R; 49/476; 220/259
[58] Field of Search .............. 74/606 R; 49/484, 485, 49/476, 408; 220/256, 259

[56] References Cited

U.S. PATENT DOCUMENTS

| | | | |
|---|---|---|---|
| 1,581,928 | 4/1926 | Kruse | 74/606 |
| 1,760,463 | 5/1930 | Abenanti | 308/36.4 |
| 1,879,127 | 2/1933 | Johnson | 49/485 |
| 2,202,482 | 5/1940 | Dahl | 49/476 |
| 3,531,577 | 9/1970 | Garlington | 49/485 X |
| 3,533,190 | 10/1970 | Hilfinger et al. | 49/501 |

FOREIGN PATENT DOCUMENTS 1148256 12/1957 France .................................. 49/476

*Primary Examiner*—Kenneth J. Dorner

[57] ABSTRACT

An improved housing for gearing and the like, the housing having at least one wall with an access opening formed by flanges of unequal widths which are spaced apart to form a liquid receiving groove. The access opening is provided with a closure door that has a baffle plate mounted on but spaced from the inner surface of the door in a position such that the plane containing the baffle plate is located intermediate the planes containing the inner surfaces of the flange defining the access opening.

1 Claim, 5 Drawing Figures

GEAR HOUSING DEVICE FOR PREVENTING OIL LEAKAGE

This application is a continuation of application Ser. No. 028,762, filed Apr. 9, 1979 and now abandoned.

BACKGROUND OF THE INVENTION

The invention pertains to a housing for gear members in which the latter are continuously lubricated by being partially submerged in a liquid lubricant contained within the housing and more particularly it pertains to a positive means of preventing leakage of the lubricant from said housing.

Gear housings and particularly those of the type having access openings with closure members such as hinged doors have until the present invention, been considered a problem relative to the forms of lubricant confining and sealing devices utilized to prevent leakage and loss of lubricant from such housings.

As is well known by those conversant with various forms of machinery which utilize enclosed gear housings, oil leakage from such housings is considered a very annoying and troublesome factor. Other than causing a loss of lubricant, and a possible fire hazard, oil which has leaked from a housing will frequently migrate to other areas of machinery which should be maintained free of lubricant.

The device according to the invention provides a positive means of preventing oil leakage in the area of the access opening of a gear housing and all oil accumulated in that area is returned to the oil reservoir located in the bottom of said housing.

U.S. Pat. No. 1,760,463 shows and describes a device for preventing oil leakage from a gear casing that utilizes a collar fixed on a gear supporting shaft and serves to prevent oil from travelling beyond it on the shaft and is effective in causing the return of the oil to its source.

SUMMARY OF THE INVENTION

The device for preventing oil leakage from a gear housing according to the invention includes an access opening in one side wall of a housing that is formed by a pair of spaced and interconnected flange members which define a liquid receiving groove therebetween. The flange members are spaced so that one is disposed inwardly of the other. The outer flange member is of lesser width than the inner one and provides a seat for a hinged closed door. A baffle plate is mounted on the inner surface of the closure door and in spaced relation thereto so that it is disposed in a plane extending parallel with and intermediate the planes containing the opposed inner surfaces of the flange members. The size of the baffle plate is smaller than the opening formed by the outer flange member and larger than the opening formed by the inner flange member. With the baffle plate being located intermediate the flange members, it is aligned with the liquid receiving groove and any oil displaced in the direction of the door will be received onto the inner surface of said baffle plate and from which it will run downwardly and into said groove. The lower surface of the groove is provided with drain holes and provide a means for returning the oil received therein to the oil reservoir provided in the bottom of the gear housing.

It is a general object of the invention to provide a gear housing with a positive means for preventing oil leakage therefrom.

A further and more specific object is to provide a positive means of preventing oil leakage from gear housings of the type having access openings with hinged doors mounted thereon.

These and other objects of the invention will become more fully apparent by reference to the appended claims and as the following detailed description proceeds in reference to the figures of drawing wherein:

DESCRIPTION OF THE PREFERRED EMBODIMENT

Figure 1:
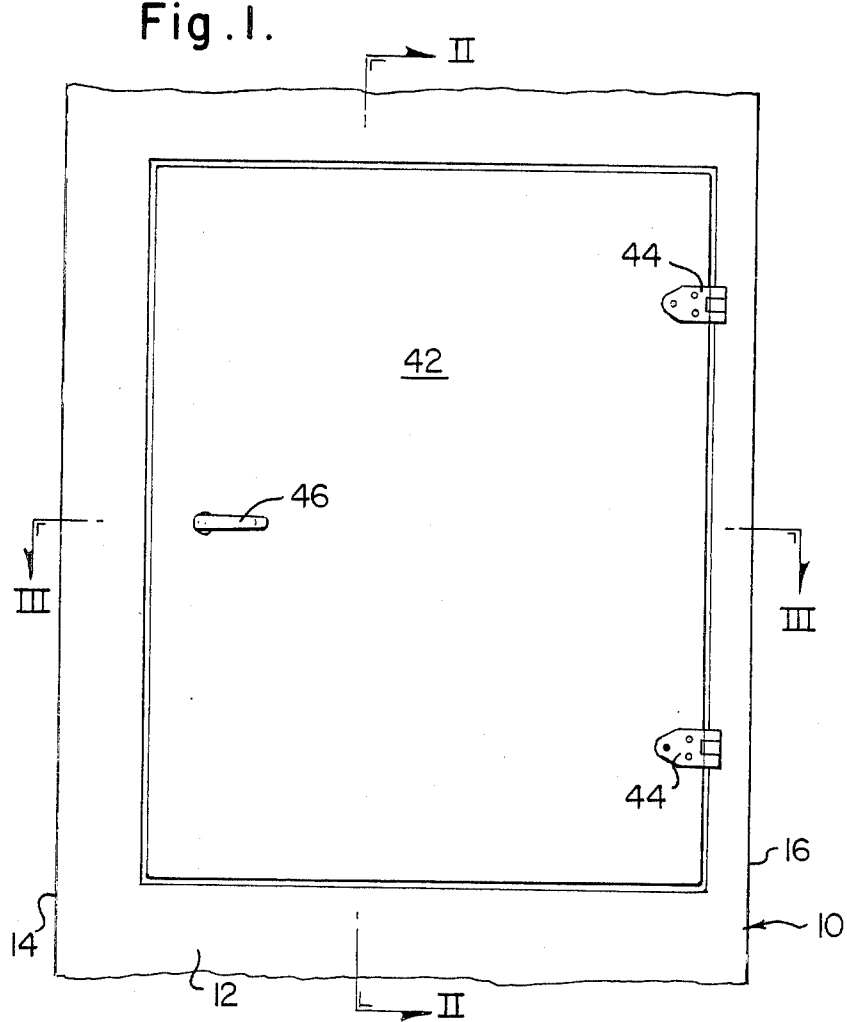
FIG. 1 is a view in front elevation of a portion of a gear housing showing a hinged closure door mounted thereon.
Figure 2:
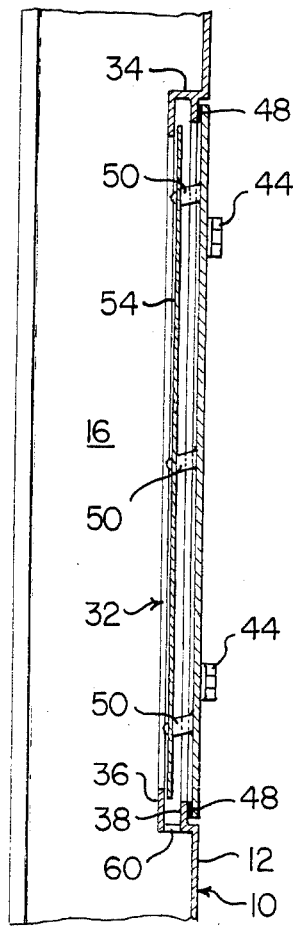
FIG. 2 is a view taken along line II—II in FIG. 1 showing in section the flange members defining the access opening and the relationship of the closure door and baffle plate thereto.
Figure 3:
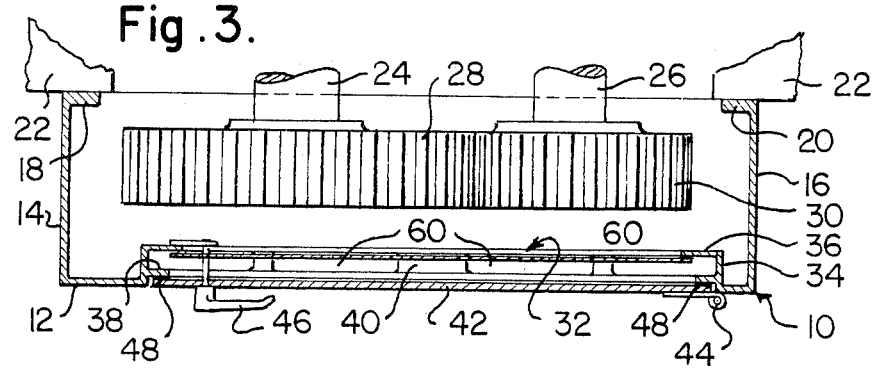
FIG. 3 is a view similar to FIG. 2 but as seen looking in the direction of the indicating arrows of line III—III in FIG. 1.

Referring now to FIGS. 1, 2 and 3, the gear housing to which the present invention is applicable is identified generally by numeral 10 and includes a front wall 12 and side walls 14 and 16. Extending rearwardly the side walls 14 and 16 terminate with inwardly directed flanges 18 and 20 respectively (FIGS. 2 and 3) that serve as a means for attaching the gear housing, by any suitable means not shown, to an appropriate piece of machinery.

Although not shown, it should be understood that the gear housing 10 is of the enclosed type and includes upper and lower surfaces with the latter being formed to retain a reservoir of lubricating oil.

As illustrated in FIG. 3 the gear housing 10 is shown mounted on a supporting frame 22 of a machine which includes a pair of shaft members 24 and 26 that extend into said gear housing. The ends of the shaft members 24 and 26 within the gear housing 10 have gear members 28 and 30 respectively mounted thereon which are disposed in meshing relationship and with the lower portion of at least one of said gears being partially submerged in the reservoir of oil (not shown) provided in the bottom of said housing.

Referring now to FIGS. 2 and 3 the front wall 12 is provided with an access opening identified generally by a numeral 32 and is formed by a lip 34 that is directed inwardly at a right angle to said wall 12 and extends completely about said opening. This lip 34 includes a pair of spaced and integrally formed flange members 36 and 38 which extend completely about and inwardly at right angles to said lip. Flange member 36 is formed on the inner end of the lip 34 and is of a width greater than flange member 38 which is disposed intermediate said flange member 36 and the outer surface of the front wall 12.

The space between the two flange members 36 and 38 defines a liquid receiving groove 40 and will be further described hereinafter.

Flange member 38 is disposed inwardly from the outer surface of the front wall 12 and forms a seat for a closure door 42 which is mounted on said front wall 12 by means of hinges 44. Adjacent that side of the closure door opposite the hinges 44, said door is provided with a conventional lever type latching device 46 for maintaining the door in a closed position or permitting the same to be opened.

Figure 4:
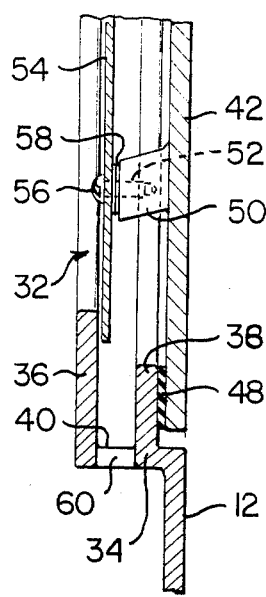
FIG. 4 is a view on an enlarged scale of the lower right hand portion of FIG. 2 showing further detail of the device according to the invention.
Figure 5:
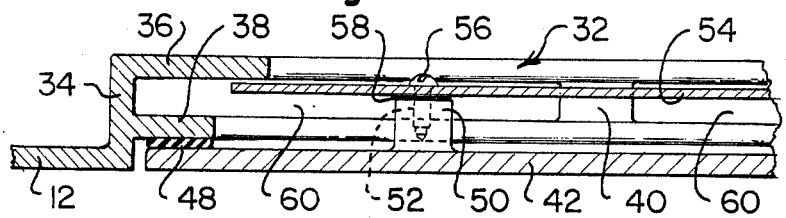
FIG. 5 is a view similar to FIG. 4 but showing a portion of the structure in FIG. 3 on an enlarged scale.

As more clearly shown in FIGS. 4 and 5 a resilient seal 48 is located between flange member 38 and the closure door 42 and being attached to either one or the other serves to prevent entrance of dust or other foreign matter into the gear housing 10.

In FIGS. 2, 4, and 5 the inner surface of the closure door 42 is shown provided with a plurality of inwardly extending and spaced apart boss elements 50 which are fixed on said inner surface by any suitable means not shown. These boss elements 50 are each provided with a threaded hole 52 and serve to assemble a baffle plate 54 on said boss elements by means of screws 56.

The baffle plate in its assembled position extends in a plane parallel with and intermediate the planes containing the opposed inner surfaces of the flange members 36 and 38.

As more clearly shown in FIGS. 4 and 5 the baffle plate 54 is disposed in rather close proximity with the inner surface of flange member 36 and to provide the desired amount of clearance therebetween shims 58 are assembled between the bosses 50 and said baffle plate.

The size of the baffle plate 54 is greater than the opening formed by the flange member 36 for reasons yet to be described and is less than the opening formed by flange member 38 so as to provide clearance for said baffle plate when it is caused to swing outwardly or inwardly with the closure door 42.

The lower most portion of the liquid receiving groove 40 is provided with openings 60 which communicate with the lower interior area of the gear housing 10.

To summarize the operation, the gears within the housing are caused to be rotated when the machine is operating and normally at a speed whereby the oil picked up by them from the reservoir is displaced throughout the interior area of said housing. During operation, all oil which is displaced in the direction of the closure door 42, is deposited onto the inner surface of the baffle plate 54. With the baffle plate being disposed vertically the oil deposited thereon is caused to run downwardly and into the lower most portion of the liquid receiving groove 40. The openings 60 in this portion of the liquid receiving groove 40 permit the oil received therein to drain back to the reservoir thus providing a positive means of preventing any possible oil leakage in the area of the access opening of the gear housing.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. An improved liquid tight housing for gears and the like comprising walls defining an enclosure for retaining a liquid gear lubricant therein, at least one of said walls having an outer surface, being vertical and having an access opening formed therein and a door for closing the access opening to prevent escape of lubricant contained within the housing, characterized in that the access opening is formed by a lip extending inwardly of said one wall at a right angle thereto and terminating at an inner end and extending completely about said opening, first and second spaced apart parallel flanges rigid with said lip and extending inwardly thereof at right angles thereto completely about said opening, said first flange being formed on the inner end of said lip and said second flange being disposed intermediate said first flange and the outer surface of said wall and forming a seat for said door, said first flange being of a width greater than the width of said second flange, said first and second flanges together with said lip forming a generally U-shaped groove for receiving lubricant, a baffle plate mounted on said door and spaced inwardly therefrom and the periphery thereof extending into said groove, there being a clearance between said baffle plate and said first flange to provide a passage for the flow of lubricant deposited on said baffle plate downwardly into said groove, and means provided in the portion of said U-shaped groove below said baffle plate to define openings permitting the flow of lubricant from the groove into said enclosure.

* * * * *